US012655928B2

(12) United States Patent
Pirner

(10) Patent No.: US 12,655,928 B2
(45) Date of Patent: Jun. 16, 2026

(54) CLEANING MODULE FOR A PIPELINE INSPECTION GAUGE

(71) Applicant: ENTEGRA LLP, Indianapolis, IN (US)

(72) Inventor: Paul Pirner, Mississauga (CA)

(73) Assignee: Entegra LLP, Indianapolis, IN (US)

( * ) Notice: Subject to any disclaimer, the term of this patent is extended or adjusted under 35 U.S.C. 154(b) by 641 days.

(21) Appl. No.: 18/178,372

(22) Filed: Mar. 3, 2023

(65) Prior Publication Data

US 2023/0279984 A1     Sep. 7, 2023

Related U.S. Application Data

(60) Provisional application No. 63/316,707, filed on Mar. 4, 2022.

(51) Int. Cl.
*F16L 55/40*          (2006.01)
*F16L 55/46*          (2006.01)
(Continued)

(52) U.S. Cl.
CPC .............. *F16L 55/40* (2013.01); *F16L 55/46* (2013.01); *F16L 2101/12* (2013.01); *F16L 2101/30* (2013.01)

(58) Field of Classification Search
CPC .............................. F16L 55/40; F16L 2101/12
See application file for complete search history.

(56) References Cited

U.S. PATENT DOCUMENTS

| 2,958,884 | A | * | 11/1960 | Hill | ........................ B08B 9/0553 |
|---|---|---|---|---|---|
|  |  |  |  |  | 15/104.19 |
| 3,056,155 | A | * | 10/1962 | Harmes | ................. B08B 9/0553 |
|  |  |  |  |  | 118/DIG. 10 |

(Continued)

FOREIGN PATENT DOCUMENTS

| CN | 103604022 | A | * | 2/2014 | .............. F16L 55/32 |
|---|---|---|---|---|---|
| CZ | 2009480 | A3 | * | 11/2010 | ............. B08B 9/049 |

(Continued)

OTHER PUBLICATIONS

International Search Report and Written Opinion in related case PCT/US2018/050723, dated Jan. 30, 2019.

(Continued)

*Primary Examiner* — Marc Carlson
(74) *Attorney, Agent, or Firm* — Maginot, Moore & Beck, LLP

(57)          ABSTRACT
A pipeline inspection gauge includes a cleaning module for a pipeline. The cleaning module includes a body portion, a suspension assembly, a plurality of brushes, and an anti-rotation device. The body portion includes a front cup and a rear cup, and the suspension assembly is coupled to the body portion between the front cup and the rear cup. The plurality of brushes include at least one forward brush that is axially aligned with at least one rear brush. The suspension assembly is configured to bias the at least one forward brush and the at least one rear brush radially outward and into engagement with an arc defined along the inner surface of the pipeline when the pipeline inspection gauge is in the pipeline. The anti-rotation device is coupled to the body portion and prevents rotation of the cleaning module when the cleaning module is used in a pipeline.

21 Claims, 5 Drawing Sheets

(51) Int. Cl.
    *F16L 101/12*        (2006.01)
    *F16L 101/30*        (2006.01)

(56)                References Cited

U.S. PATENT DOCUMENTS

| | | | | |
|---|---|---|---|---|
| 3,460,028 A * | 8/1969 | Beaver | ............... | G01N 27/9073 |
| | | | | 346/33 P |
| 4,011,100 A * | 3/1977 | Ross | ....................... | B08B 9/047 |
| | | | | 134/8 |
| 4,027,349 A * | 6/1977 | Clavin | ................... | B08B 9/049 |
| | | | | 15/88 |
| 4,852,391 A * | 8/1989 | Ruch | ................... | F16L 55/1283 |
| | | | | 73/40.5 R |
| 4,938,167 A * | 7/1990 | Mizuho | ................... | F16L 55/28 |
| | | | | 118/317 |
| 5,293,905 A * | 3/1994 | Friedrich | ............ | F16L 55/1283 |
| | | | | 166/135 |
| 6,190,090 B1 * | 2/2001 | Campbell | ............... | F16L 55/38 |
| | | | | 166/170 |
| 6,232,773 B1 * | 5/2001 | Jacobs | ................... | G01N 27/82 |
| | | | | 324/242 |
| 8,281,444 B2 * | 10/2012 | Rosen | ................... | B08B 9/0558 |
| | | | | 134/8 |
| 2005/0072237 A1 * | 4/2005 | Paige | ................... | G01N 29/265 |
| | | | | 73/623 |
| 2005/0223825 A1 * | 10/2005 | Janssen | ................... | F16L 55/38 |
| | | | | 73/865.8 |
| 2009/0293622 A1 * | 12/2009 | Rosen | ................... | G01N 27/90 |
| | | | | 73/643 |
| 2010/0162503 A1 * | 7/2010 | Rosen | ....................... | B08B 9/035 |
| | | | | 15/104.061 |
| 2010/0305875 A1 * | 12/2010 | Williams | ................. | G01B 5/12 |
| | | | | 702/35 |
| 2011/0138555 A1 * | 6/2011 | Freeman | ................... | B08B 9/04 |
| | | | | 15/104.061 |
| 2015/0152992 A1 * | 6/2015 | Choi | ....................... | F16H 48/11 |
| | | | | 475/248 |
| 2016/0136700 A1 | 5/2016 | Schaller et al. | | |
| 2016/0167094 A1 * | 6/2016 | Danilov | ................... | B60L 7/28 |
| | | | | 15/104.061 |
| 2016/0238184 A1 | 8/2016 | Fielers et al. | | |
| 2018/0010934 A1 * | 1/2018 | Pirner | ................... | F16L 55/00 |
| 2019/0086368 A1 * | 3/2019 | Plichta | ................... | G01N 29/04 |
| 2019/0086448 A1 * | 3/2019 | Anisimov | ............. | G01N 17/04 |
| 2021/0404592 A1 * | 12/2021 | Pirner | ................... | F16L 55/34 |

FOREIGN PATENT DOCUMENTS

| | | | | | |
|---|---|---|---|---|---|
| DE | 102018111240 A1 * | 11/2019 | .......... | B08B 9/0557 |
| EP | 3312490 A1 * | 4/2018 | ............... | F16L 55/40 |
| GB | 2260613 A * | 4/1993 | ............ | G01N 27/83 |
| GB | 2297666 A * | 8/1996 | ............. | F16L 55/48 |
| KR | 102351430 B1 * | 2/2022 | ............ | B08B 9/055 |
| NL | 8502527 A * | 4/1987 | ......... | F16L 55/1645 |
| WO | WO-2004020893 A1 * | 3/2004 | ......... | F16L 55/1651 |
| WO | 2010002871 A1 | 1/2010 | | |

OTHER PUBLICATIONS

Extended European Search Report corresponding to European Patent Application No. 18856227.6, dated Apr. 30, 2021 (11 pages).

* cited by examiner

CLEANING MODULE FOR A PIPELINE INSPECTION GAUGE

CROSS-REFERENCE TO RELATED APPLICATIONS

This application claims priority from U.S. Provisional Patent Application No. 63/316,707, filed Mar. 4, 2022, the entire contents of which are incorporated herein by reference.

FIELD

This application relates to the field of pipeline inspection tools, and particularly to cleaning modules for use in association with smart pipeline inspection gauges.

BACKGROUND

Pipeline systems are an integral component of global energy distribution. There are millions of miles of energy pipelines in the United States alone, delivering trillions of cubic feet of natural gas and hundreds of billions of ton/miles of liquid petroleum products each year. To ensure the safety of these vast pipeline systems and often to comply with governmental regulations, pipeline operators must frequently service their pipelines and perform periodic inspections to assess pipeline integrity. Mechanical devices referred to as pipeline inspection gauges (which may also be referred to herein as "pigs" or "in-line inspection tools") are often employed to perform these maintenance and inspection functions inside the pipeline. Different types of pigs are used to perform different tasks. These pigs include gauging tool pigs, cleaning pigs, and smart pigs. One example of a pig is disclosed in U.S. Pat. No. 11,118,718, which issued on Sep. 14, 2021, and is assigned to Entegra LLP, the entire contents of which are incorporated by reference herein.

Cleaning pigs are used to remove corrosion and debris such as block powder, wax, sand and sludge from the internal wall of a pipeline. A clean pipeline is also important for the proper use of smart pigs, which may at times require electrical measurements to be taken along the interior surface of the pipeline. When the pipeline is clean, electrical conductivity is improved and higher quality data is generated by the smart pig.

Prior art cleaning pigs typically include a module that includes multiple brushes comprised of numerous bristles. However, these cleaning pigs are also associated with numerous problems. While cleaning pigs are capable of cleaning the interior surface of a pipeline, the bristles wear quickly and only clean the pipeline for a limited distance. Many prior art cleaning pigs have brushes that wear quickly during use such that the contact load between the brush and the pipe changes as the brushes encounter increasing wear. The bristles on these pigs tend to wear out easily, rendering the pig ineffective for cleaning purposes. If the bristles on many prior art cleaning pigs wear only a $1/4$ inch, the ability of the pig to clean a pipeline is very limited or non-existent. Moreover, the cleaning performed with these prior devices is often insufficient to gain good electrical conductivity between the pipe inner surface and the measuring instrument mounted on the smart pig.

In view of the foregoing, it would be advantageous to provide a pig module that is capable of sufficiently cleaning a pipeline to allow for efficient and effective use of the electronic sensors of a smart pig. It would also be advantageous if such pig offered a long cleaning life. It would be of further advantage if the cleaning module could be produced inexpensively and could be incorporated for use with existing pigs.

SUMMARY

In at least one embodiment a pipeline inspection gauge is configured with a cleaning module for cleaning an inner surface of a pipeline. The pipeline inspection gauge includes a body portion, a suspension assembly, a plurality of brushes assemblies, and an anti-rotation device. The suspension assembly is coupled to the body portion. The plurality of brush assemblies include at least one forward brush assembly and at least one rear brush assembly that is axially aligned with the at least one forward brush assembly. The at least one forward brush assembly and the at least one rear brush assembly are coupled to the suspension assembly, and the suspension assembly is configured to bias the at least one forward brush assembly and the at least one rear brush assembly radially outward and into engagement with an arc defined along the inner surface of the pipeline when the pipeline inspection gauge is in the pipeline. The anti-rotation device is coupled to the body portion and prevents rotation of the cleaning module when the cleaning module is used in a pipeline.

In another embodiment, a cleaning module for a pipeline inspection gauge is configured for insertion into a pipeline. The cleaning module includes a body portion and a suspension assembly coupled to the body portion. At least one brush is coupled to the suspension assembly, and the suspension assembly configured to bias the at least one brush radially outward and into engagement with an arc defined along the inner surface of the pipeline when the pipeline inspection gauge is in the pipeline. An anti-rotation device is also coupled to the body portion and configured to prevent rotation of the body portion when the cleaning module is in the pipeline.

In yet another embodiment, a method of inspecting a pipeline includes inserting a cleaning module into a pipeline and moving the cleaning module a distance through the pipeline in order to create a cleaned arc line along an inner surface of the pipeline that extends the distance. Rotation of the cleaning module is prevented when the cleaning module is moved the distance through the pipeline. The method further includes engaging a sensor module with the inner surface on the cleaned arc line, and taking electrical measurements along the cleaned arc line.

The foregoing features and advantages for a pipeline inspection gauge with a cleaning module, as well as others, will become more readily apparent to those of ordinary skill in the art with reference to the following detailed description and accompanying drawings. While it would be desirable to provide a cleaning module for a pig that provides one or more of these or other advantageous features as may be apparent to those reviewing this disclosure, the teachings disclosed herein extend to those embodiments which fall within the scope of the appended claims, regardless of whether they include or accomplish one or more of the advantages or features mentioned herein.

DESCRIPTION

Figure 1:
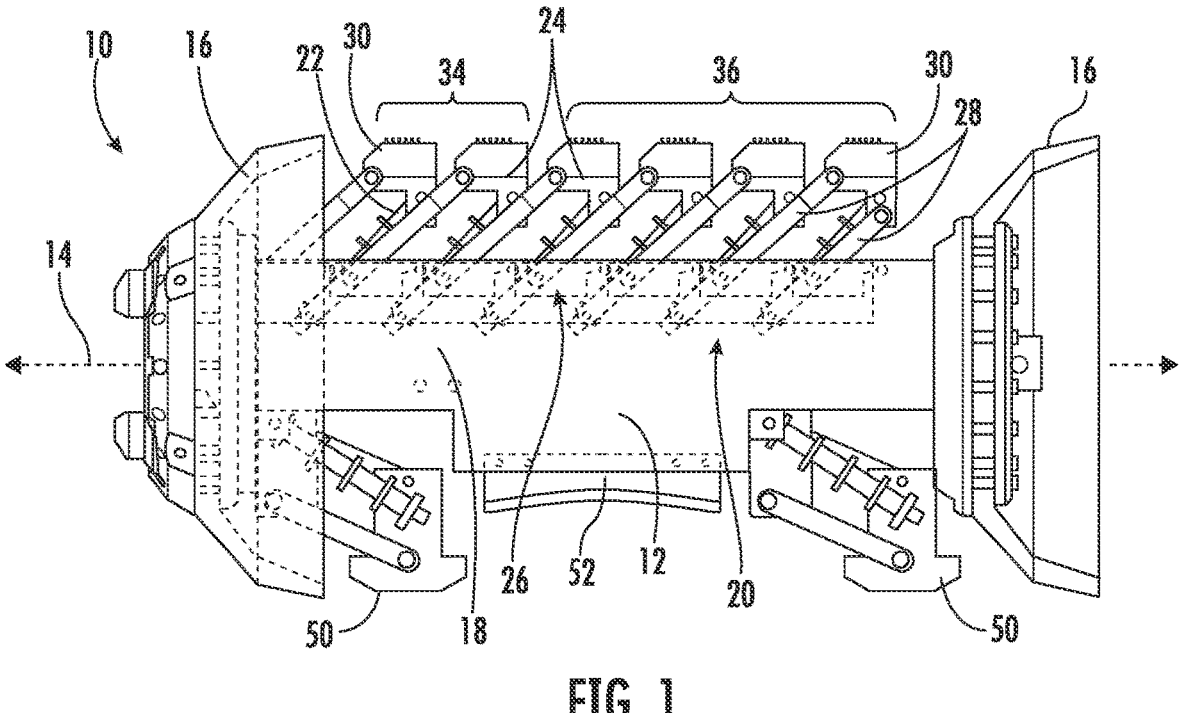
FIG. 1 shows a side view of a cleaning module for a pig.
Figure 2A:
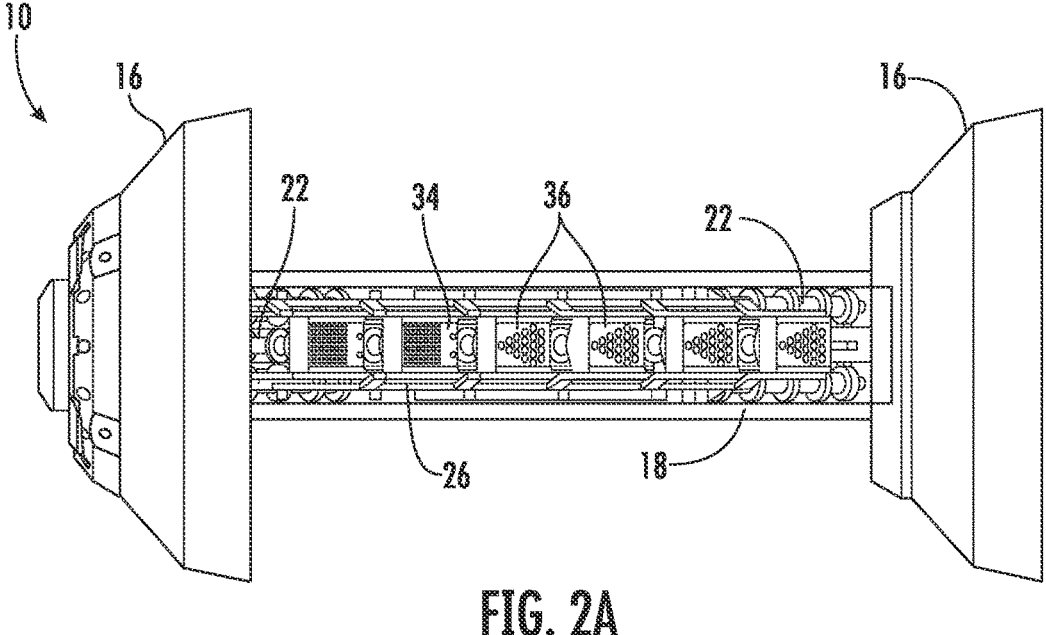
FIG. 2A shows a top view of the cleaning module of FIG. 1.
Figure 2B:
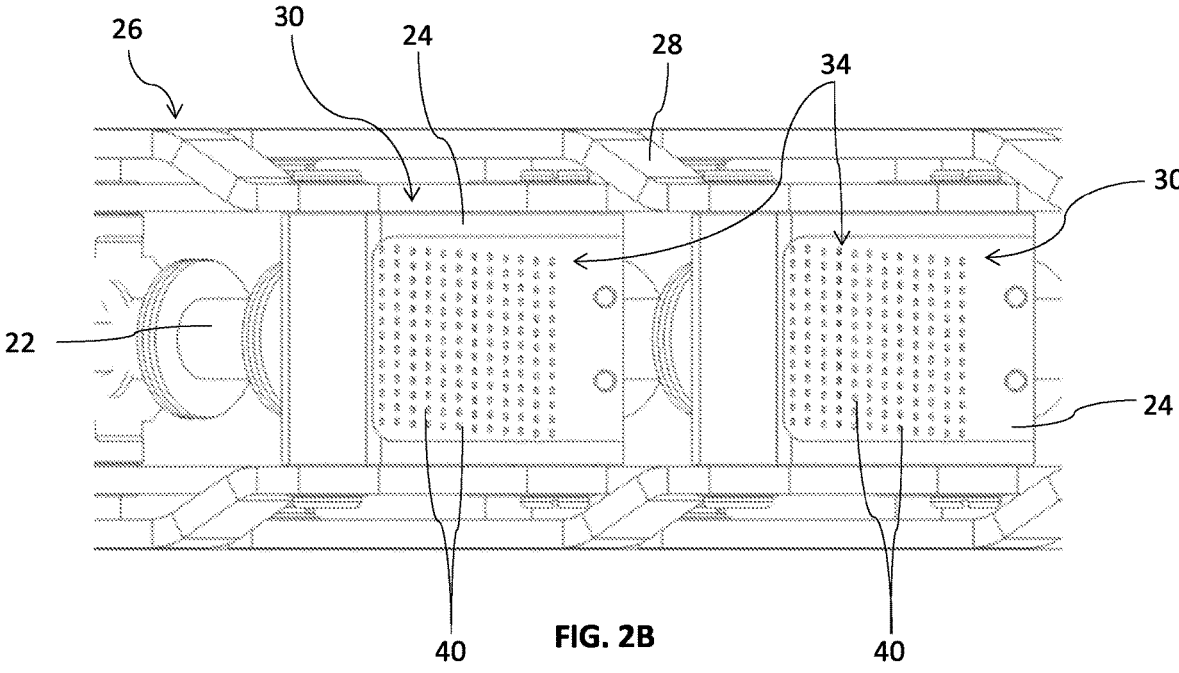
FIG. 2B shows a top view of the cleaning module of FIG. 1 with a detailed view of two brushes with flat bristles.
Figure 2C:
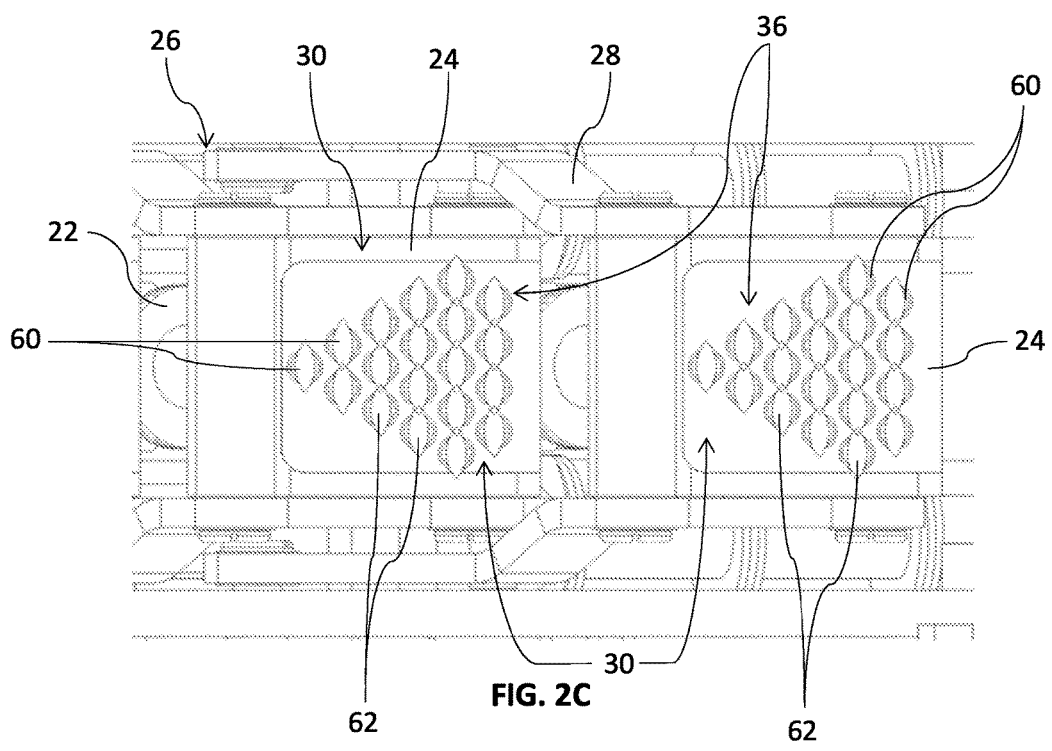
FIG. 2C shows a top view of the cleaning module of FIG. 1 with a detailed view of two brushes with pencil bristles.
Figure 3:
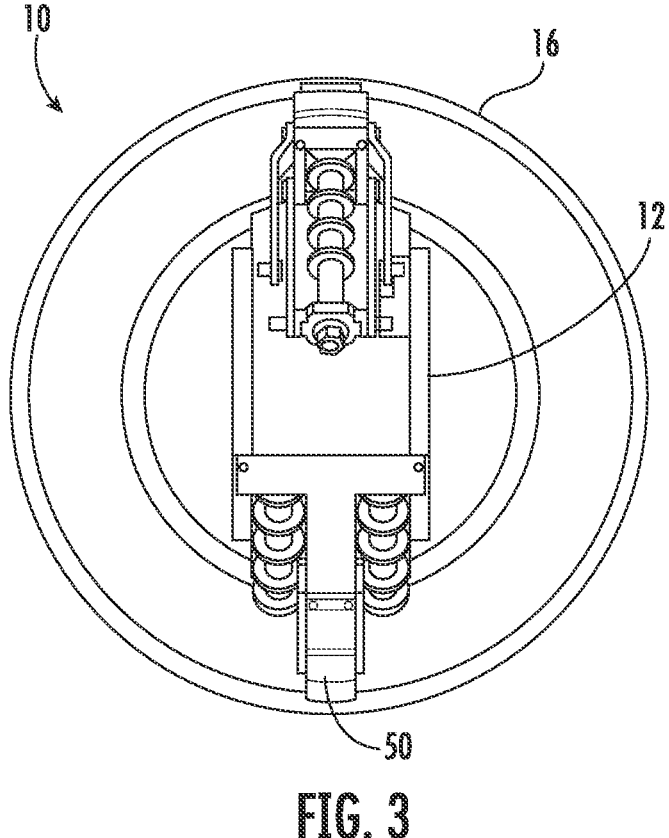
FIG. 3 shows a front view of the cleaning module of FIG. 1.

With reference now to FIGS. 1-3, a cleaning module 10 for a pig includes a body portion 12 defining a central axis 14 with a plurality of annular discs/cups 16 coupled to the body portion 12. The cups 16 include a front drive cup and a rear drive cup (and in some embodiments there are more or less than two cups). Two sidewalls 18 extend along the body portion 12 between the drive cups 16. A suspension assembly 20 is mounted to the sidewalls 18, and a plurality of brush assemblies 30 are supported by the suspension assembly 20. The brush assemblies 30 are advantageously arranged axially along only a limited circumferential portion of the suspension assembly 20 (e.g., arranged axially along a top of the cleaning module with each brush spanning some limited circumferential distance around the cleaning module). An anti-rotation device 52 is configured to maintain a relatively constant orientation for the cleaning module when it is inserted into a pipeline. As explained in further detail herein, the configuration of the brush assemblies 30 and related components of the cleaning module provides for targeted cleaning of a limited portion of a pipeline. This targeted cleaning is particularly advantageous when the cleaning module is used in association with the sensitive electronic equipment of a smart pig where good electrical conductivity is required.

The cups 16 are cups that are commonly used in pigs for suspension and propulsion purposes. In the embodiment of FIGS. 1-3, a front cup and a rear cup are provided on the cleaning module and the sidewalls 18 are coupled to each of the front and rear cups. However, in other embodiments, the cleaning module 10 may be separated into sections and may include more than two cups. Also, in some embodiments of the cleaning module 10, other suspension means may be used such that there are fewer than two cups. For example, the body of the cleaning module 10 could be towed by one pig module and suspended by wheels or other suspension members.

The suspension assembly 20 is coupled to the sidewalls 18. The suspension assembly includes a plurality of springs in the form of spring cylinders 22 that bias a plurality of brush platforms 24 in an outward/radial direction. The springs may be any of various types of springs, such as Belleville washer springs, coil springs, or any of various other types of springs. Alternatively, it will be recognized that the suspension assembly could be provided by other types of biasing mechanisms (e.g., hydraulic cylinders). In the embodiment of FIG. 1, the suspension assembly 20 is an upper suspension assembly. In addition to the upper suspension assembly, the cleaning module 10 may also include another suspension assembly, such as the lower counter-suspension assembly 50 shown in FIG. 1. The counter-suspension assembly 50 includes sled rails/supports and springs that bias the supports radially outward.

Six brush platforms 24 are shown in the embodiment disclosed herein. A dynamic framework 26 is coupled to and positioned between the spring cylinders 22 and the brush platforms 24. The framework 26 includes a plurality of pivotable arms that translate forces from the spring cylinders 22 to the brush platforms, and vice-versa, in a manner that will be recognized by those of ordinary skill in the art. Accordingly, the suspension assembly 20 biases the brush platforms 24 radially outward, but also permits radially inward movement when sufficient inward forces are applied to the brush platforms.

The brush assemblies 30 are mounted on the brush platforms 24. Each brush assembly 30 includes a brush mount and at least one brush with a plurality of bristles. Six brushes are shown in the embodiment disclosed herein, including two forward brushes 34 and four rear brushes 36. As shown in the figures, the assemblies 30 are aligned such that they are arranged axially in a linear manner along the top portion of the cleaning module 10. Each brush spans some arc of a limited degree along the top portion of the cleaning module 10. For example, each brush may span across an arc that ranges between 2° and 45° on either side of the mounted position of the cleaning module (e.g., +/–2° to 45° from the twelve o'clock position). In at least one embodiment, the brushes extend across an arc that spans about 3 inches (e.g., between 2-4 inches). In the embodiment of FIGS. 1-3, no other brushes are included on the cleaning module outside of those in this top position. However, as noted in further detail below, it is contemplated that in at least some embodiments the cleaning module will include brushes at multiple positions around the cleaning module (e.g., both the twelve o'clock and six o'clock positions).

Each of the brushes 34, 36 includes a plurality of bristles that extend outwardly, in a generally radial direction on the cleaning module. As explained below, the bristles on the forward brushes 34 are a different type and differently configured than the bristles on the rear brushes 36. The bristles are generally provided by filaments comprised of high tensile steel (e.g., carbon steel or stainless steel), polypropylene, other polymer materials, or any of various other materials as will be recognized by those of ordinary skill in the art. The spring rate and the pre-load on the bristles is also relatively flat.

FIG. 2B shows a top view of the bristles 40 of the forward brushes 34. As shown in FIG. 3, the bristles of the forward brushes are flat bristles arranged in a matrix of individual bristles (e.g., a 12×13 matrix of individual bristles). The flat bristles 40 are individual solid beams (as opposed to clustered strands) having a generally rectangular cross-sectional shape. These flat bristles 40 are comprised of strands of high tensile steel, but in alternative embodiments may be comprised of other hardened materials. In at least some embodiments, each flat bristle is a solid steel beam made of music wire having dimensions of approximately 0.05"×0.10". While the flat bristles 40 are shown in the figures are arranged in a rectangular/matrix-like configuration with offset rows, it will be recognized that other configurations are possible. For example, in other embodiments the flat bristles 40 may be arranged in a curved configuration or in a triangular/pyramidal configuration with additional bristles in each successive row.

FIG. 2B shows a top view of the bristles 60 of the rear brushes 36. These bristles 60 are pencil bristles. The pencil bristles 60 are comprised of filaments/strands of steel, polypropylene, or any of various other materials as will be recognized by those of ordinary skill in the art. Each of the strands/filaments has a generally circular cross-section. The strands/filaments are grouped together in multiple bristle clusters 62 on each brush. In the embodiment disclosed herein, each rear brush 36 includes six rows of bristle clusters 62. The bristle clusters 62 are arranged in a triangular/pyramid configuration starting with a single bristle cluster 62 in the first row with one additional bristle cluster in each successive row. However, the final row of the triangular configuration includes one less bristle cluster than the penultimate row. In other words, instead of one additional bristle cluster in the final row, the final row includes one less bristle cluster than the previous row (i.e., row five includes five bristle clusters, but row six includes four bristle clusters instead of six). While the bristle clusters 62 shown in the figures are arranged in a triangular/pyramid configuration, it will be recognized that other configurations are possible. For example, in other embodiments the bristle clusters 62 may be arranged in a curved or rectangular configuration with offset rows. While it has been determined that the brush arrangement disclosed herein, including the configuration, arrangement and ratio of forward brushes 34 and rearward brushes 36 is effective for cleaning an arc along the interior surface of a pipeline, it will be recognized that other brush arrangements are also contemplated herein.

The cleaning module 10 may be coupled to a pig in a train-like manner, as will be recognized by those of ordinary skill in the art (e.g., may be included as one module on a pig such as that shown in U.S. Pat. No. 11,118,718, referenced above). In such an embodiment, the body portion 12 provides one part of a larger body of the pig. One typical use of the cleaning module 10 is an arrangement wherein the cleaning module 10 provides the front portion of a smart pig. In such an arrangement, the cups 16 of the cleaning module are only a few of the many total cups in the pig. Such a pig may include numerous other tools, sensors and modules used in association with pipeline cleaning and/or inspection. In another embodiment, the cleaning module 10 is a standalone device that is used separately from other pipeline cleaning and/or inspection devices.

In operation, the cleaning module forms a clean axial strip (which may be referred to herein as a "cleaned arc line") along the top of the inner surface of a pipeline, the clean axial strip having a circumferential width defined by an arc spanned by the brushes. As the cleaning module 10 moves through the pipeline, the flat bristles 40 of the forward brushes 34 act to first crush and loosen corrosion and debris. Then, the pencil bristles 60 of the rear brushes 36 (which may also be referred to as "pencil brushes") sweep away any remaining debris, dust and/or paste-like material. This leaves a relatively smooth, clean surface that is electrically conductive and facilitates use of the electronic sensors of the smart pig. As described herein, because the cleaning module 10 only includes brushes configured to clean some limited portion/arc of the inner surface of a pipeline (e.g., the brushes arranged on the top of the cleaning module), the cleaning module 10 is not intended for applications when complete cleaning of the entire pipeline circumference/ring is desired. Instead, the intended application for the cleaning module 10 is to provide electrical conductivity along a limited section of the inner surface of the pipeline (e.g., a three inch-wide arc centered along the twelve o'clock position and extending axially along a straight line distance).

Because a clean line along some length of the pipeline is all that is necessary to take proper electrical measurements, the cleaning module 10 is weighted so it does not rotate to a significant degree as it travels along the pipeline. As shown in FIG. 3, an anti-rotation device in the form of a ballast 52 is provided on the bottom portion of the cleaning module. The ballast 52 may be, for example, a relatively heavy piece of steel or other material that is coupled to a bottom of the sidewalls 18, thus serving to stabilize and reduce the amount of rotation of the cleaning module 10 as it moves through the pipeline. While a ballast is disclosed herein as the device used to stabilize the cleaning module 10 and prevent rotation within the pipeline, it will be recognized that the anti-rotation device 52 may alternatively be provided in other forms (e.g., wheels mounted sixty degrees apart along a bottom portion of the module, steered or not steered wheels or rails, weights, etc.). Moreover, while the anti-rotation device 52 is configured to prevent rotation of the cleaning module within the pipeline, it will be recognized that some limited amount of rotation may nevertheless result. The degree of rotation allowed by the anti-rotation device may be different in various embodiments and configurations of the anti-rotation device. For example, the degree of rotation allowed by one embodiment of the anti-rotation device may be as much as 90°, but in other embodiments, the anti-rotation device may limit rotation to 30°, 10°, or less.

As noted above, the suspension structures 20/50 spring bias the brushes against the inner wall/surface of the pipeline (e.g., an upper arc along the inner surface of the pipeline). The suspension structures 20/50 and spring loaded bristles 40, 60 apply a constant pressure against the pipe even as they wear. This results in a long lasting arrangement capable of effectively cleaning long stretches of a pipeline with a straight line that can be drawn along such stretches, and rendering the pipeline ready for analysis with a smart pig.

During pipeline analysis, the smart pig includes two sensor elements that run along the clean top strip of the pipe and measure electrical conductivity/voltage across the length of the pipe (e.g., six feet). From the measured voltage (in microvolts), the cathodic protection of the pipeline (CPCM) can be determined. The current in the pipeline is then mapped, inch by inch. This results in a map of the current density of the pipe, and the associated cathodic protection of the pipeline. It will be recognized that the cleaning tool/pig may be used with or without other tool moduli. As noted previously, in at least one embodiment, the cleaning tool may be implemented as the front part of a smart pig train.

The cleaning module 10 of FIGS. 1-3 may also be used in association with a method of cleaning a limited portion of a pipeline. For example, the cleaning module 10 may be used to clean a relatively small arc line that extends some axial length of the pipeline and is defined by a circumferential width spanning the 11 o'clock to 1 o'clock curvature on the pipeline (e.g., an arc of approximately 30° to 60°). As another example, the cleaning module 10 may be used to clean a relatively large arc line spanning the 7 o'clock to 5 o'clock curvature on the pipeline (e.g., an arc of approximately 280° to 310°). As used herein, the term "arc line" refers to a portion of a pipeline that extends some axial length and has a circumferential width/span along the inner circumference of a pipeline that is less than 360° (i.e., less than a full circle). The term "major arc line" refers to an arc line that has a span that is less than 360° but greater than or equal to 180°. The term "minor arc line" refers to an arc line that has a span that is less than 180°. The term "limited arc line" refers to a minor arc line along the inner circumference of a pipeline that has a span that is less than 90°. The term "substantially limited arc line" refers to a minor arc line along the inner circumference of a pipeline that has a span that is less than 30°. As noted herein, the bristles of the cleaning module 10 effectively perform cleaning along an arc of the pipeline. A "cleaned arc line" refers to an arc line on the inner surface of a pipeline that has been cleaned/treated by one or more brushes of the cleaning module 10 such that the arc line has a border that is defined along portions of the pipeline that remain uncleaned/untreated by the one or more brushes of the cleaning module. It will be recognized that a cleaned arc line may not extend in a perfectly straight line, but extends in a substantially axial direction along the inner surface with some limited amount of circumferential deviation based on the effectiveness of the anti-rotation device in reducing rotation of the cleaning module during operation.

In at least some embodiments, the arc cleaned by the module 10 is a substantially limited arc near the top of the pipeline (i.e., spans across the 12 o'clock position). In other embodiments, the arc cleaned by the module 10 may be positioned at other locations on the pipeline (e.g., spanning across the 3 o'clock, the 6 o'clock, or the 9 o'clock positions). In each of various cases, depending on the size of the pipeline, and the desired span of the arc, the arc may be relatively small in width (e.g., an arc spanning ⅛ of an inch), or may also be significantly larger in width (e.g., an arc spanning 6 inches or more). As noted herein, the bristles of the cleaning module 10 effectively perform this cleaning along a circumferential arc and through an axial length/stretch of the inner surface of the pipeline. Subsequently, a smart pig may be used to take electrical measurements along the cleaned stretch of the pipeline. For example, a smart pig may be used to effectively measure the CP (cathodic protection) voltage of the pipeline along the cleaned stretch of pipeline. Because electrical conductivity is improved along said cleaned stretch of pipeline, the sensitive electronic sensors and equipment on the smart pig is empowered to generate higher quality data than would be possible along a dirty stretch of pipeline.

Figure 4:
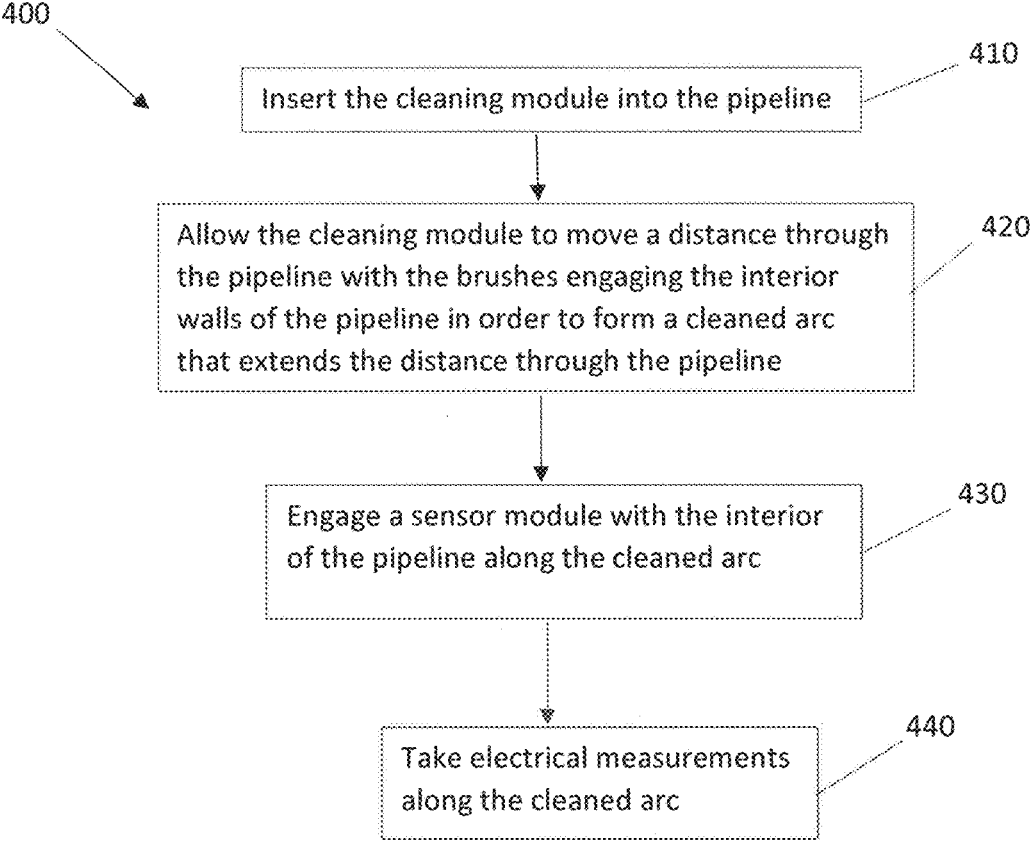
FIG. 4 is a block diagram illustrating a method of cleaning a pipeline with the cleaning module of FIG. 1.

With reference now to FIG. 4, a method 400 of inspecting a pipeline is disclosed, wherein the method involves both cleaning a portion of the pipeline and performing electrical measurements along the cleaned portion of the pipeline. The method 400 begins at block 410 by inserting a cleaning module (e.g., the cleaning module 10 of FIGS. 1-3) into a pipeline. When the cleaning module is inserted into the pipeline, the suspension assembly 20 biases the brush platforms 24 and the associated brushes 34, 36 in a radially outward direction and into engagement with the inner surface of the pipeline. As noted previously, the brushes 34, 36 span across an arc defined along the interior walls of the pipeline. The cleaning module may be included as part of a pig that is also in the pipeline, or may be a separate member within the pipeline.

As noted in block 420 of FIG. 4, when fluid is allowed to flow in the pipeline, the cleaning module is carried along with the fluid for some distance through the pipeline. Over this distance, the brushes 34, 36 of the cleaning module scrape/scrub the interior walls of the pipeline throughout the distance. The brushes are configured in a unique arrangement that advantageously cleans an arc of the pipeline over the distance. The flat bristles 40 on the forward brushes 34 act to first crush and loosen corrosion and debris. Then, the pencil bristles 60 of the rear brushes 36 sweep away any remaining debris, dust and/or paste-like material leaving a relatively smooth, clean surface that is configured to efficiently conduct electricity without many of the resistances and impedances associated with a dirty pipeline surface.

Simultaneously with the cleaning performed by the brushes 34, 36, the anti-rotation device 52 prevents significant rotation of the cleaning module 10 within the pipeline. In most embodiments, the anti-rotation device 52 is configured to prevent rotation of the cleaning module 10 that would be greater than fifty percent (50%) of the degree of the arc cleaned by the cleaning module. For example, if the brushes cover a 60° arc, the anti-rotation device may limit rotation of the cleaning module to no more than 30° within the pipeline. As a result, a straight line may be drawn along the entire cleaned surface that is provided by the arc of the brushes and the cleaned length of the pipeline. In other words, the cleaned arc line on the inner surface of the pipeline is defined circumferentially by an arc and axially along some distance of the pipeline through which the cleaning module traveled. Because of the anti-rotation features of the cleaning module, a straight line may be drawn through the cleaned portion even though the entire circumferential inner surface of the pipeline was not cleaned by the cleaning module. It will be recognized that the cleaning module 10 does not clean the entire pipeline, but only cleans a limited number of arc lines along a length of the pipeline. Stated differently, the cleaning module is configured to clean arc lines along a length of the pipeline without cleaning portions of the pipeline circumferentially adjacent to the cleaned arc lines.

With a cleaned arc line provided along a distance of the pipeline, the pipeline is ready for inspection/analysis that will provide accurate electrical measurements. Accordingly, as noted in block 430 of FIG. 4 the sensors of a smart pig are brought into engagement with the cleaned arc defined along the interior surface of the pipeline. Thereafter, as noted at block 440 of FIG. 4, the electronic sensors of the smart pig are used to take electrical measurements along the cleaned arc (e.g., a CP measurement). Accordingly, the cleaning module 10 described herein may be used in a method that involves both (i) the cleaning of limited portions along the interior surface of a pipeline, and (ii) electrical measurements taken along the cleaned inner surface of the pipeline.

Figure 5:
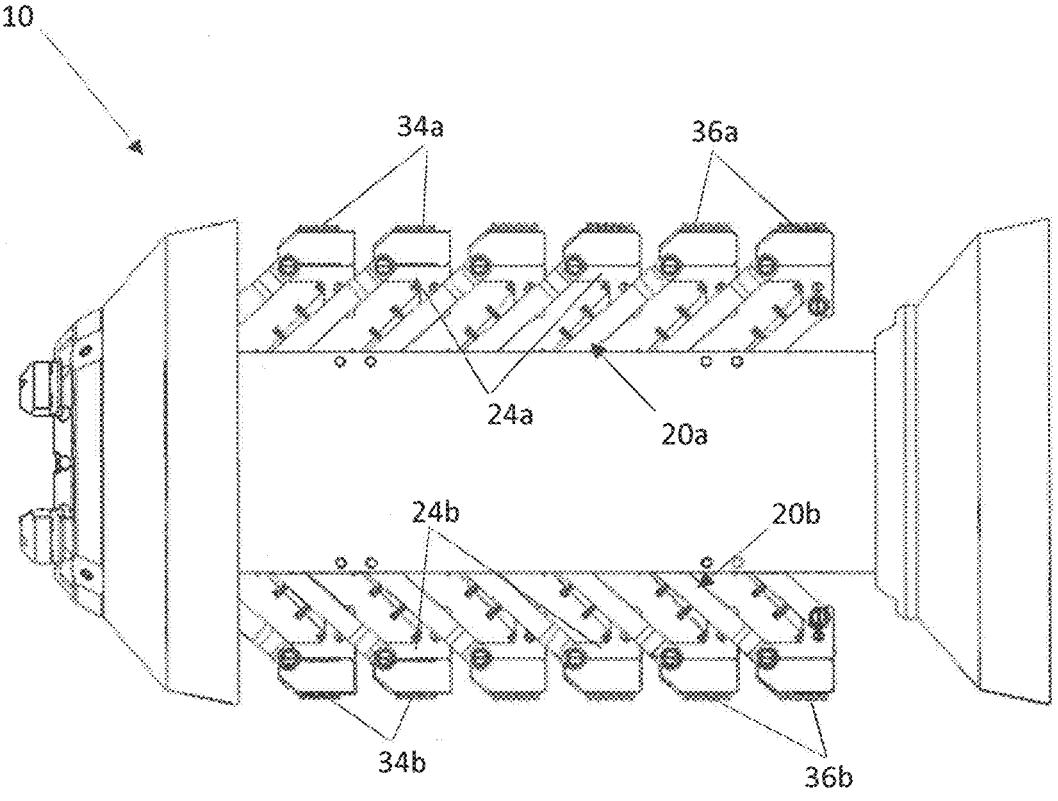
FIG. 5 shows a side view of an alternative embodiment of the cleaning module for a pig, the cleaning module including brushes on two sides of the module.

It will be recognized that one embodiment of the cleaning module is shown in FIGS. 1-3, but numerous alternative embodiments are also possible. For example, FIG. 5 shows an alternative embodiment of the cleaning module 10 that includes two opposing suspension structures 20 and associated brushes 34, 36. As shown in FIG. 5, the cleaning module 10 includes an upper suspension structure 20a and a lower suspension structure 20b, the upper suspension structure 20a arranged 180° opposite the lower suspension structure 20b (i.e., the lower suspension structure 20b is separated from the upper suspension structure 20a by an arc such that the lower suspension structure biases the brushes in an opposite radial direction from the upper suspension structure). The cleaning module also includes upper brush platforms 24a and lower brush platforms 24b, upper forward brushes 34a and lower forward brushes 34b, as well as upper rear brushes 36a and lower rear brushes 36b. This embodiment of the cleaning module 10 may also incorporate a ballast 52 or multiple ballasts (not shown) in order to maintain a consistent orientation of the cleaning module within the pipeline. In operation, the upper brushes and lower brushes in the embodiment of FIG. 5 serve to provide two cleaned paths along the inner surface of the pipeline through the distance which the cleaning module traversed. While FIG. 5 shows one possible alternative embodiment of the cleaning module 10 for a pig, it will be recognized that numerous other alternative embodiments are also contemplated, but not disclosed herein, including embodiments that include additional brush arrangements and additional resulting paths.

The foregoing detailed description of one or more embodiments of the cleaning module for a pipeline inspection gauge have been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A pipeline inspection gauge configured for use in a pipeline having an inner surface, the pipeline inspection gauge comprising:
    a body portion;
    a suspension assembly coupled to the body portion;
    at least one forward brush coupled to the suspension assembly, the suspension assembly configured to bias the at least one forward brush radially outward and into engagement with an arc defined along the inner surface of the pipeline when the pipeline inspection gauge is in the pipeline;
    at least one rear brush coupled to the suspension assembly and axially aligned with the at least one forward brush, the suspension assembly configured to bias the at least one rear brush radially outward and into engagement with the arc defined along the inner surface of the pipeline when the pipeline inspection gauge is in the pipeline; and
    an anti-rotation device coupled to the body portion.

2. The pipeline inspection gauge of claim 1 wherein the at least one forward brush is provided on a forward brush assembly, wherein the at least one rear brush is provided on a rear brush assembly, and wherein the at least one forward brush is a different type of brush than the at least one rear brush.

3. The pipeline inspection gauge of claim 1 wherein the at least one forward brush includes a plurality of flat bristles, and wherein the at least one rear brush includes a plurality of pencil bristles.

4. The pipeline inspection gauge of claim 3 the flat bristles are arranged in a rectangular configuration of individual bristles on the at least one forward brush, and wherein the pencil bristles are arranged in clusters of bristles having a triangular configuration on the at least one rear brush.

5. The pipeline inspection gauge of claim 4 wherein each of the flat bristles is comprised of a beam having a rectangular cross-section, and wherein each of the pencil bristles is comprised of a filament having a circular cross-section.

6. The pipeline inspection gauge of claim 5 wherein each of the flat bristles is comprised of high tensile steel.

7. The pipeline inspection gauge of claim 1 wherein the pipeline inspection gauge is a smart pig further comprising a front cup and a rear cup coupled to the body portion.

8. The pipeline inspection gauge of claim 1 wherein suspension assembly includes a plurality of springs that bias a plurality of brush platforms in a radially outward direction.

9. The pipeline inspection gauge of claim 1 wherein the anti-rotation device is provided by a ballast coupled to the body portion.

10. The pipeline inspection gauge of claim 1 further comprising a counter-suspension assembly coupled to the body portion and arranged opposite the suspension assembly.

11. The pipeline inspection gauge of claim 10 further comprising at least one additional brush coupled to the counter-suspension assembly, the counter-suspension assembly configured to bias the at least one additional brush radially outward and into engagement with a second arc defined along the inner surface of the pipeline when the pipeline inspection gauge is in the pipeline.

12. A cleaning module for a pipeline inspection gauge configured for insertion into a pipeline, the cleaning module comprising:
    a body portion;
    a suspension assembly coupled to the body portion;
    at least one brush coupled to the suspension assembly, the suspension assembly configured to bias the at least one brush radially outward and into engagement with an arc defined along an inner surface of the pipeline when the pipeline inspection gauge is in the pipeline, wherein the cleaning module is configured to clean the pipeline along the arc without cleaning portions of the pipeline circumferentially adjacent to the arc; and
    an anti-rotation device coupled to the body portion and configured to reduce rotation of the cleaning module within the pipeline.

13. The cleaning module of claim 12 wherein the body portion includes a front cup and a rear cup, wherein the suspension assembly is coupled to the body portion between the front cup and the rear cup.

14. The cleaning module of claim 12 wherein the at least one brush includes at least one forward brush coupled at a forward brush platform and at least one rear brush coupled to a rear brush platform, wherein the at least one forward brush is a different type of brush than the at least one rear brush.

15. The cleaning module of claim 14 wherein the at least one forward brush and the at least one rear brush are both configured to span the arc.

16. The cleaning module of claim 14 wherein the at least one forward brush includes a plurality of flat bristles, and wherein the at least one rear brush includes a plurality of pencil bristles.

17. The cleaning module of claim 12 wherein the anti-rotation device is provided by a ballast coupled to the body portion.

18. The cleaning module of claim 12 wherein the suspension assembly is a first suspension assembly, the pipeline inspection gauge further comprising a second suspension assembly that is opposite the first suspension assembly on the body portion, and a plurality of brushes coupled to the second suspension assembly.

19. A method of inspecting a pipeline, the method comprising:
    inserting a cleaning module into a pipeline;
    moving the cleaning module a distance through the pipeline in order to create a cleaned arc line along an inner surface of the pipeline that extends the distance, wherein rotation of the cleaning module is limited when the cleaning module is moved the distance through the pipeline;
    engaging a sensor module with the inner surface on the cleaned arc line; and
    taking electrical measurements along the cleaned arc line.

20. The method of claim 19 wherein inserting the cleaning module into the pipeline includes inserting the cleaning module of claim 11 into the pipeline and engaging at least one brush with the inner surface of the pipeline as the cleaning module is moved the distance through the pipeline.

21. A cleaning module for a pipeline inspection gauge configured for insertion into a pipeline, the cleaning module comprising:

a body portion;

a suspension assembly coupled to the body portion; and at least one brush coupled to the suspension assembly, the
suspension assembly configured to bias the at least one
brush radially outward and into engagement with an arc
defined along an inner surface of the pipeline when the
pipeline inspection gauge is in the pipeline, wherein the
cleaning module is configured to clean the pipeline
along the arc without cleaning portions of the pipeline
circumferentially adjacent to the arc, the at least one
brush including at least one forward brush including a
plurality of flat bristles coupled to a forward brush
platform and at least one rear brush including a plu-
rality of pencil bristles coupled to a rear brush platform.

\* \* \* \* \*